United States Patent

Ayyildiz et al.

[11] Patent Number: 6,109,400
[45] Date of Patent: Aug. 29, 2000

[54] IMPACT ABSORBER

[75] Inventors: Metin Ayyildiz, Köln; Holger Kirchner, Ruppichteroth, both of Germany

[73] Assignee: Mannesmann Boge GmbH, Bonn, Germany

[21] Appl. No.: 09/112,677

[22] Filed: Jul. 9, 1997

[30] Foreign Application Priority Data

Jul. 9, 1997 [DE] Germany .......................... 197 29 287

[51] Int. Cl.[7] ................................................ F16D 57/00
[52] U.S. Cl. ..................... 188/266.1; 267/64.26
[58] Field of Search ................. 188/266.1, 269, 188/281, 314, 316, 317; 267/116, 119, 126, 130, 127, 64.26, 64.28; 293/133, 134

[56] References Cited

U.S. PATENT DOCUMENTS

| | | | |
|---|---|---|---|
| 3,533,613 | 10/1970 | Bendicsen | 267/64.12 |
| 4,078,638 | 3/1978 | Koyama et al. | 188/288 |
| 4,634,082 | 1/1987 | Kendall | 244/100 R |
| 4,657,228 | 4/1987 | Lautzenhiser | 267/64.15 |
| 4,854,554 | 8/1989 | Ludwig | 267/64.11 |
| 5,242,157 | 9/1993 | Bonenberger | 267/64.26 |
| 5,285,877 | 2/1994 | Bonenberger et al. | 188/314 |
| 5,558,188 | 9/1996 | Samonil et al. | 188/299.1 |
| 5,713,555 | 2/1998 | Zurfluh et al. | 248/599 |
| 5,845,749 | 12/1998 | Moretz et al. | 267/64.11 X |

FOREIGN PATENT DOCUMENTS 4030035 2/1995 Germany .......................... 267/64.26

*Primary Examiner*—Robert J. Oberleitner
*Assistant Examiner*—Pamela J. Lipka
*Attorney, Agent, or Firm*—Cohen, Pontani, Lieberman & Pavane

[57] ABSTRACT

An impact absorber for decelerating a vehicle during a collision with an obstacle by hydraulic damping forces and pneumatic spring forces includes two tubes that are telescopically displaceable one inside the other. An internal tube of the two tubes is closed off to the outside by a base. A gas space subjected to high pressure is disposed adjacent said base and interacts with a first liquid space via a separating piston which is axially guided in the internal tube in a sealed manner. The first liquid space is hydraulically connected to a second liquid space via a throttle opening through an intermediate wall attached inside the internal tube. A working piston attached to a piston rod is guided in the internal tube in a sealing manner and interacts via the piston rod with a third liquid space in an external one of the two tubes. A control which can be connected to two chambers is provided to extend the impact absorber or to return it to a normal position.

5 Claims, 1 Drawing Sheet

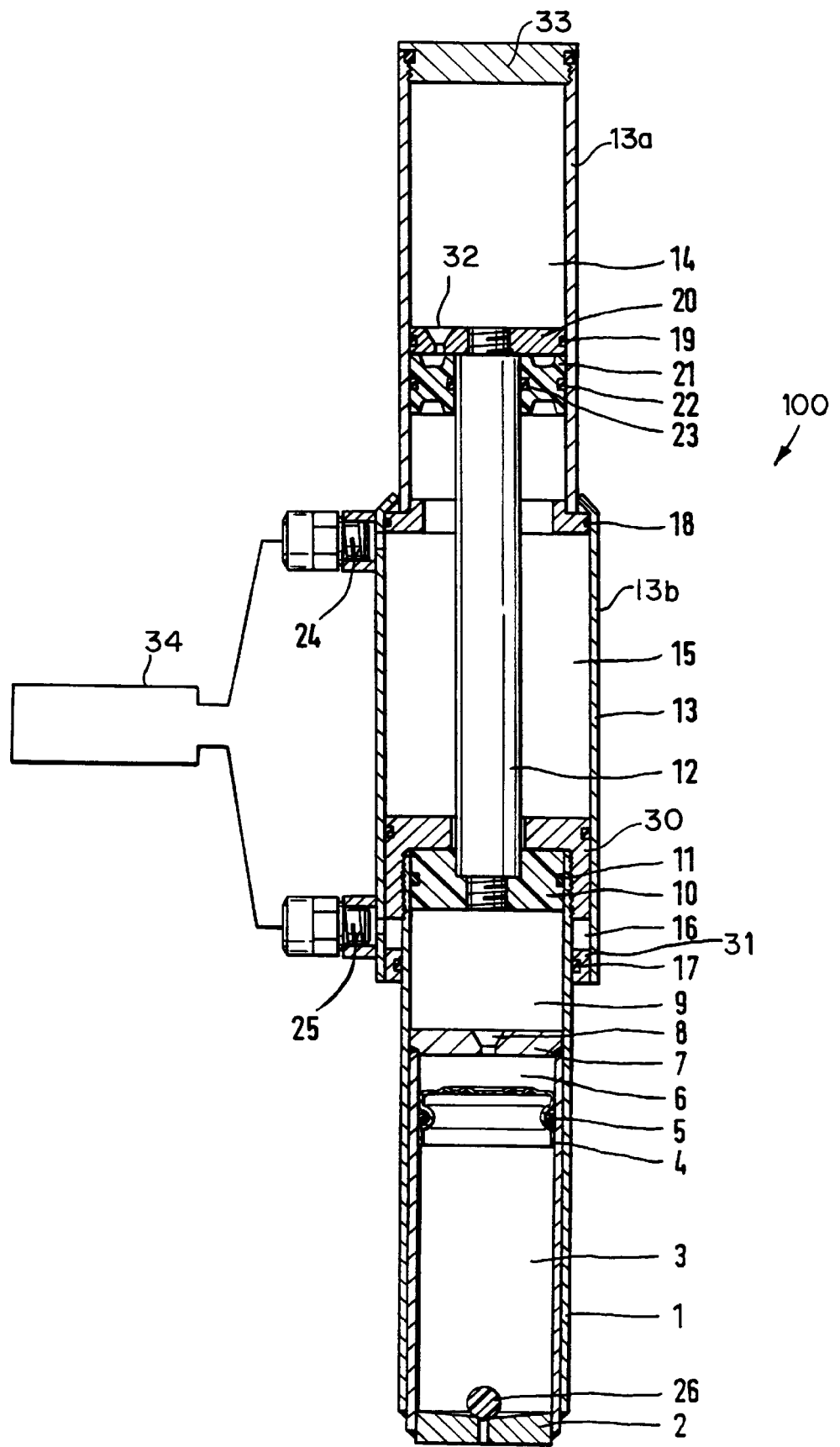

IMPACT ABSORBER

BACKGROUND OF THE INVENTION

1. Field of the Invention

The present invention relates to an impact absorber for decelerating a vehicle during a collision with an obstacle by hydraulic damping forces and pneumatic spring forces. The impact absorber has an internal tube and an external tube that are telescopically displaceable one inside the other. The internal tube is closed off to the outside by a base and has a gas space which is subjected to high pressure and interacts with a first liquid space by a separating piston which is axially guided in the internal tube in a sealed off manner. The first liquid space is hydraulically connected via a throttle opening, which is located in an intermediate wall attached inside the internal tube, to a second liquid space bounded by a working piston. The working piston is attached to a piston rod and is guided in the internal tube in a sealing manner and interacts with a third liquid space. A control which can be connected to two chambers is provided to extend the impact absorber assembly or to return it to its normal position.

2. Description of the Related Art

Prior art impact absorbers which employ two tubes that can be displaced one inside the other are known, for example, from DE 40 30 035 A1. In this prior art impact absorber, a gas space is located in an internal tube which is subjected to high pressure and is separated from a first liquid space by a separating piston. The first liquid space is connected to a second liquid space via a throttle point which generates hydraulic damping forces in the normal position, in which the stroke is of such a magnitude as to absorb an impact up to 8 km/h without damage to any parts. In this position, the volume compensation and the rebound of the impact absorber into the normal position are effected by means of a gas cushion prevailing in the closed gas space. A third liquid space is provided which enables the absorption of impact speeds higher than 8 km/h. Pressure can be applied to the third liquid space via a control. Starting from an initial pressure and a basic position, an increase in pressure pushes the external tube and the internal tube apart from one another by a defined axial distance. In the process, a further liquid space is produced between the working piston and a second piston connected to a piston rod. This prior art design involves a high level of construction outlay and requires a large installation space.

SUMMARY OF THE INVENTION

The object of the present invention is to provide an impact absorber which reversibly withstands an impact speed of a vehicle of about 15 km/h, has a simple construction with parts which are easy to manufacture, takes up only a small amount of space overall, and has a rupture safeguard which becomes active in the event of a fire.

This object is achieved according to the invention with an impact absorber having a piston rod connected, on the one hand, to a working piston which is sealingly axially movably mounted in an internal tube of the impact absorber and, on the other hand, to a throttle disk that is axially movably mounted in an external tube of the impact absorber. The throttle disk subdivides a third liquid space in the external tube. In addition, an annular separating piston is arranged between the third liquid space and a chamber which causes the extension. The construction unit comprising the working piston, piston rod and throttle disk is arranged so as to be axially movable in the internal tube and in the external tube and is made up of simple components which are easy to manufacture. The overall construction of the impact absorber is simplified by the direct connection of the piston rod, formed without overflow channels, to the working piston, and is cost-effective to manufacture by dispensing with a piston and a piston-rod guide with a seal, and requires a smaller installation space.

As shown by a further feature of the invention, a liquid and/or gaseous pressure medium is fed to two chambers for controlling the extension of the impact damper or the return of the impact damper to its normal position. Correspondingly, the control for extension is independent of the pressure medium, as a result of which the pressure medium present in the vehicle, regardless of whether it is gaseous or liquid, can be used for the control.

In a further refinement of the invention, the working piston and the annular separating piston are made of a material which melts in the event of a fire and produces a pressure relief in the interior. Provision may also be made for the connections leading to the control and opening into the chambers to be designed in this manner for the event of a fire and thus producing a connection leading to the outside.

A further rupture safeguard which is simple to produce is obtained according the invention by providing an opening in the gas space which leads to the outside and is sealed by an intended melting element. The intended melting element melts in the event of a fire and brings about pressure relief of the gas space. The intended melting element may simultaneously serve as a valve part for filling the gas space. This intended melting element is easily combined with the working piston and/or annular separating piston which melts in the event of a fire. An inexpensive design of the working piston, the annular separating piston and the intended melting element is obtained in that these items are produced from a plastic material which melts at a given temperature.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

The FIGURE is a longitudinal cross-sectional view of an impact damper according to an embodiment of the present invention.

DETAILED DESCRIPTION OF THE PRESENTLY PREFERRED EMBODIMENTS

The FIGURE shows a longitudinal section of an impact absorber 100 having a variable length. An internal tube 1 is closed off to the outside by a base 2 and accommodates a gas space 3 provided with a gas filling subjected to high pressure. The internal tube 1 also includes a first liquid space 6 separated from the gas space 3 by a separating piston 4 which slides axially within the internal tube and is sealed on the inside wall of the internal tube by a sealing ring 5. The other end of the first liquid space 6 is bounded by an intermediate wall 7 which is attached inside the internal tube 1. The intermediate wall 7 has a throttle opening 8 and thus produces a hydraulic connection to a second liquid space 9 which is also arranged in the internal tube 1. On the other side of the second liquid space 9, a working piston 10 acts on the second liquid space 9. The working piston 10 is sealed off in the internal cylinder 1 by a sealing ring 11. The working piston 10 is prevented from leaving the internal tube 1 by an axial stop formed by a guide part 30 attached to the end of the internal cylinder 1 opposite from the base 2. The internal cylinder 1 slides on the inside wall of an external tube 13 with the guide part 30. A ring 31 provided with a sealing ring 17 at the end of the external tube 13 and the guide part 30 bound a chamber 16 between the internal tube 1 and the external tube 13. The chamber 16 is provided with a connection 25. Located on the other side of the axial stop/guide part 30 in the external tube 13 is a chamber 15 into which a connection 24 opens.

A piston rod 12, provided with an annular separating piston 21, is fixedly connected, on the one hand, to the working piston 10 and, on the other hand, to a throttle disk 20 which has at least one throttle opening 32. The annular separating piston 21 is guided in a sealing manner on the piston rod 12 by a sealing ring 23 and on the inside wall of the external tube 13 by a sealing ring 22 and forms the movable separating wall between the chamber 15 and a third liquid space 14 in the external tube 13. The third liquid space 14 is bounded by the annular separating piston 21 and a base 33 attached inside the external tube 13. The throttle disk 20, which is accommodated in the third liquid space 14, is connected to the piston rod 12 and is axially sealingly guided in the external tube 13 by a sealing ring 19. The external tube 13 is designed to have a stepped diameter. A first section 13a with the smaller diameter accommodates the third liquid space 14, the throttle disk 20 and the annular separating piston 21. This first section 13a is preferably formed separate from a second section 13b. A connection part and a sealing ring 18 arranged therein fixedly connect the first section 13a to the second section 13b which has a larger diameter and is sealed off to the outside.

In the FIGURE, the impact absorber 100 is illustrated in an extended or lengthened position. This position of the impact absorber 100 is achieved when a gaseous or liquid pressure medium is fed by a control 34 via the connection 24 to the chamber 15 which causes the extension. The internal pressure produced in the chamber 15 pushes the internal tube 1 out of the external tube 13 and thus moves the piston rod 12 connected to the working piston 10 and the throttle disk 20 such that the throttle disk 20 moves toward the annular separating piston 21. The volume of the piston rod 12 extending from the third liquid space 14 has to be replaced and the annular separating piston 21 therefore moves toward the third liquid space 14. This pushing-out movement is finished, according to the embodiment illustrated, when the throttle disk 20 rests on the annular separating piston 21, as shown in the FIGURE. If, for example, a gaseous pressure medium is fed to the chamber 15 which brings about the extension, or when a liquid pressure medium is fed in and there is still a gas cushion in the chamber 15, the internal tube 1 is first pushed into the external tube 13 in the event of an impact. During the impact, the high gas pressure in the gas space 3 initially causes the working piston 10 to remain in the position illustrated and only the throttle disk 20, connected to the piston rod 12, moves into the third liquid space 14. The throttle opening 32 of the throttle disk 20 becomes active in this operating phase. During the movement of the throttle disk 20, the annular separating piston 21 is displaced into the chamber 15 as a result of the volume of the piston rod 12 entering the third liquid space 14, since the chamber 15, with the gas or partial gas filling mentioned above, acts as a pneumatic spring. In this first phase, the impact energy is absorbed until the piston rod 12 rests with the throttle disk 20 on the base 33 of the external tube 13. Subsequently, in a second phase, further impact energy is absorbed by the working piston 10, connected to the piston rod 12, being pushed into the second liquid space 9 and thus displacing damping liquid counter to the force of the pneumatic spring of the gas space 3 through the throttle opening 8 in the inter-mediate wall 7 into the first liquid space 6. The impact absorber 100 is designed so that if impact takes place at a speed equal to or less than 15 km/h, the impact energy is fully absorbed without deformation of components. Therefore, the impact absorber 100 is returned to the extended position on account of the pressures prevailing in the spaces and chambers.

The normal position of the impact absorber, in which impact energy of the vehicle is absorbed at an impact speed of up to about 8 km/h, is set when a pressure medium is fed to the chamber 16 by the control 34 via the connection 25. When the connection 25 is open, the internal tube 1 is inserted into the internal tube 13 until the throttle disk 20, connected to the piston rod 12, rests on the base 33 of the external tube 13. In this position of the impact absorber 100, the impact energy is absorbed in accordance with the second phase described above.

A good rupture safeguard in the event of a fire is achieved if the working piston 10, the annular separating piston 21 and/or the intended melting element 26 are produced from a material, preferably a plastic material, which melts if there is a fire. The dimensioning of the individual spaces and chambers and their pressures are in accordance with the required energy absorption characteristics.

The invention is not limited by the embodiments described above which are presented as examples only but can be modified in various ways within the scope of protection defined by the appended patent claims.

We claim:

1. An impact absorber for decelerating a vehicle during a collision with an obstacle using hydraulic damping forces and pneumatic spring forces, said impact absorber comprising:

an external tube having a first end and a second end;
an internal tube having a first end and a second end, wherein said first end of said internal tube is inserted into said external tube through said second end of said external tube and said internal tube is telescopically displaceable with respect to said external tube;
said second end of said internal tube having a base closing off said internal tube;
a separating piston sealingly axially movably mounted in said internal tube;
a gas space under high pressure disposed in said internal tube bounded by said base and said separating piston;
an intermediate wall fixedly connected to said internal tube between said separating piston and said first end of said internal tube;
a first liquid space bounded in said internal tube by said separating piston and said intermediate wall;
a working piston sealingly movably mounted in said internal tube between said intermediate wall and said first end of said internal tube;
a second liquid space bounded in said internal tube by said intermediate wall and said working piston, said intermediate wall having a throttle opening hydraulically connecting said first liquid space to said second liquid space;

a throttle disk sealingly movably mounted in said external tube;

a piston rod fixedly connecting said working piston and said throttle disk;

a guide connected to said first end of said internal tube guiding said piston rod and sealingly movably connected in said external tube;

an annular separating piston sealingly mounted between said piston rod and said external tube;

a third liquid space bounded in said external tube by said annular separating piston and said first end of said external piston, wherein said throttle disk divides said third liquid space into two parts;

a first chamber bounded by said annular separating piston and said working piston;

a seal between said second end of said external tube and said internal tube;

an annular second chamber between said internal tube and said external tube bounded by said guide and said seal; and a pressure control device connectable to said first chamber and said second chamber for extending said impact absorber and returning said impact absorber to a normal position, wherein said throttle disk abuts said first end of said external tube at said normal position.

2. The impact absorber of claim 1, wherein said pressure control device is operably connected for selectively feeding one of a liquid pressure medium and a gaseous pressure medium to said first chamber and said second chamber.

3. The impact absorber of claim 1, wherein each said working piston and said annular separating piston comprises a material which melts in the event of a fire and thereby producing a pressure relief in an interior of said impact absorber.

4. The impact damper of claim 1, wherein said gas space comprises an opening which leads to an exterior of said impact damper and said impact damper further comprising an intended melting element arranged in said gas space for sealing said opening, wherein said intended melting element melts in the event of a fire, thereby relieving pressure in said gas space.

5. The impact damper of claim 4, wherein each said working piston, said annular separating piston, and said intended melting element comprises a plastic material which melts at a given temperature.

* * * * *